US006968644B1

(12) United States Patent  (10) Patent No.:  US 6,968,644 B1
Garcia  (45) Date of Patent:  Nov. 29, 2005

(54) ERGONOMIC FISH GRIPPING DEVICE

(76) Inventor: Avelardo Abe Garcia, 1115 Arch St., Batesville, AR (US) 72501

( * ) Notice: Subject to any disclaimer, the term of this patent is extended or adjusted under 35 U.S.C. 154(b) by 0 days.

(21) Appl. No.: 10/847,416

(22) Filed: May 17, 2004

(51) Int. Cl.$^7$ .......................................... A01K 97/00
(52) U.S. Cl. ........................... 43/4; 606/205; 294/16; 294/25; 294/118
(58) Field of Search ................. 43/4, 5, 53.5; 606/205, 606/207, 208; 294/16, 25, 118; 30/298

(56)  References Cited

U.S. PATENT DOCUMENTS

| 97,399 | A | * | 11/1869 | Holmes | 294/118 |
|---|---|---|---|---|---|
| 125,931 | A | * | 4/1872 | Brinkerhoff | 30/298 |
| 158,526 | A | * | 1/1875 | Riedling | 30/234 |
| 674,865 | A | | 5/1901 | Harrington | 43/5 |
| 753,919 | A | * | 3/1904 | Rowe | 606/208 |
| 1,513,367 | A | * | 10/1924 | Brix | 606/208 |
| 1,559,839 | A | * | 11/1925 | Asher | 30/298 |
| 1,949,452 | A | * | 3/1934 | Chadwick | 43/4 |
| 2,184,909 | A | * | 12/1939 | Crompton | 30/256 |
| 2,214,985 | A | * | 9/1940 | Bachmann | 294/118 |
| 2,263,965 | A | * | 11/1941 | Fiori | 43/53.5 |
| 2,294,758 | A | * | 9/1942 | Manske | 43/53.5 |
| 2,481,007 | A | * | 9/1949 | Dugdale | 43/53.5 |
| 2,578,344 | A | * | 12/1951 | Everett | 294/118 |
| 2,595,989 | A | * | 5/1952 | Smeltz | 43/53.5 |
| 2,597,394 | A | * | 5/1952 | Snowden | 43/53.5 |
| 2,634,159 | A | * | 4/1953 | Agneberg | 43/4 |
| 2,643,151 | A | * | 6/1953 | Zupancic | 43/53.5 |
| 2,669,991 | A | * | 2/1954 | Curutchet | 606/205 |
| 2,669,993 | A | * | 2/1954 | Curutchet | 606/205 |
| 2,785,501 | A | * | 3/1957 | Nicholson | 43/53.5 |
| 2,891,275 | A | * | 6/1959 | Schuls | 43/53.5 |
| 2,892,285 | A | * | 6/1959 | Shifrin | 43/53.5 |
| 3,106,035 | A | * | 10/1963 | Tennyson | 43/53.5 |
| 3,201,888 | A | * | 8/1965 | Barbee | 43/4 |
| 3,277,895 | A | * | 10/1966 | Johnson | 606/205 |
| 3,367,703 | A | * | 2/1968 | Pittis | 294/16 |
| 3,560,039 | A | * | 2/1971 | Gruber | 294/118 |
| 3,664,703 | A | * | 5/1972 | Talley | 43/5 |
| 3,921,327 | A | * | 11/1975 | Casazza | 43/4 |
| 3,986,287 | A | * | 10/1976 | Arteaga | 43/5 |
| 4,306,336 | A | * | 12/1981 | Kovar | 452/185 |
| D278,117 | S | * | 3/1985 | Smith | D8/57 |
| 4,559,853 | A | * | 12/1985 | Oye | 43/4 |
| 4,563,833 | A | * | 1/1986 | Aucoin | 43/4 |
| 4,572,179 | A | * | 2/1986 | Teitelbaum et al. | 606/207 |
| 4,600,007 | A | * | 7/1986 | Lahodny et al. | 606/205 |
| 4,620,386 | A | * | 11/1986 | Hare | 43/4 |
| 4,656,772 | A | * | 4/1987 | Lopez | 43/4 |
| 4,666,451 | A | * | 5/1987 | Samaria | 294/25 |
| 4,742,617 | A | * | 5/1988 | Gauvry | 30/232 |
| 4,854,626 | A | * | 8/1989 | Duke | 43/5 |
| 4,899,482 | A | * | 2/1990 | Gerdes | 43/4 |
| 4,965,954 | A | * | 10/1990 | Cavazos | 43/4 |
| 5,005,292 | A | * | 4/1991 | Jones | 30/298 |

(Continued)

FOREIGN PATENT DOCUMENTS

AU          131281 A1 *  2/1949  ................. 43/53.5

(Continued)

Primary Examiner—Darren W. Ark
(74) Attorney, Agent, or Firm—Head, Johnson & Kachigian

(57) ABSTRACT

An apparatus and method for applying a firm grip to the lip of a fish includes a pair of pincers. The device has two handles each comprised of at least one ring to which digits may be inserted. One of the two handles has a ring that may rotate about a pivot point. The device has a locking mechanism that allows it to be held in a closed position.

4 Claims, 2 Drawing Sheets

U.S. PATENT DOCUMENTS

| | | | | |
|---|---|---|---|---|
| 5,046,381 A | * | 9/1991 | Mueller | 30/298 |
| 5,054,226 A | * | 10/1991 | Hart | 43/4 |
| 5,092,074 A | * | 3/1992 | Zincke | 43/53.5 |
| 5,119,585 A | | 6/1992 | Camp | 43/53.5 |
| 5,133,737 A | * | 7/1992 | Grismer | 606/205 |
| 5,136,744 A | * | 8/1992 | Allsop et al. | 43/4 |
| 5,339,555 A | * | 8/1994 | Miskimins | 43/5 |
| 5,557,874 A | * | 9/1996 | Pietrandrea et al. | 43/4 |
| 5,568,698 A | * | 10/1996 | Harding et al. | 43/53.5 |
| 5,626,513 A | * | 5/1997 | Curtis | 452/185 |
| 5,636,468 A | * | 6/1997 | Valpredo | 43/53.5 |
| 5,843,100 A | * | 12/1998 | Meade | 606/205 |
| 6,017,358 A | * | 1/2000 | Yoon et al. | 606/205 |
| 6,061,858 A | * | 5/2000 | Shepard | 43/4 |
| 6,122,828 A | * | 9/2000 | Asterino, Jr. | 30/298 |
| 6,205,699 B1 | * | 3/2001 | Bogni | 43/53.5 |
| 6,238,414 B1 | * | 5/2001 | Griffiths | 606/205 |
| 6,256,923 B1 | * | 7/2001 | Norton | 43/4 |
| 6,272,709 B1 | * | 8/2001 | Strini | 43/4 |
| 6,397,512 B1 | * | 6/2002 | Chang | 43/53.5 |
| 6,508,827 B1 | * | 1/2003 | Manhes | 606/205 |
| 6,560,913 B1 | | 5/2003 | Liao | 43/5 |
| 6,571,505 B1 | * | 6/2003 | Poiencot, Jr. | 43/5 |
| 6,602,124 B2 | | 8/2003 | Miller | 452/185 |
| 6,656,205 B1 | * | 12/2003 | Manhes | 606/205 |
| 6,730,109 B2 | * | 5/2004 | Wollmer | 606/207 |

FOREIGN PATENT DOCUMENTS

| | | | | |
|---|---|---|---|---|
| CA | 2176663 A1 | * | 11/1996 | |
| DE | 2514712 A1 | | 10/1975 | |
| FR | 2476439 A1 | * | 8/1981 | |
| FR | 2599937 A1 | * | 12/1987 | 43/53.5 |
| GB | 28135 A1 | * | 12/1902 | 43/53.5 |
| JP | 7-313030 B1 | | 12/1995 | |
| JP | 10-52200 B1 | * | 2/1998 | |
| JP | 2002-45098 B1 | * | 2/2002 | |
| JP | 2002-335839 B1 | * | 11/2002 | |
| RU | 1355209 A1 | * | 11/1987 | 43/5 |

* cited by examiner

ERGONOMIC FISH GRIPPING DEVICE

BACKGROUND OF THE INVENTION

1. Field of the Invention

The present invention relates to a device for firmly grasping a fish by its mouth. Specifically, the device uses a pair of locking pincers to grasp a lip of a fish so that it may be removed from the water without being touched directly by a person's hands.

2. Prior Art

Fishing is one of the oldest arts in the world and has been continuously developed and improved over the past several millennia. When a fish is caught on a fishing hook, they are difficult to handle because they squirm and are very slippery. Many different devices have been developed for pulling a fish out of the water and for holding a fish while the hook is removed from its mouth.

U.S. Pat. No. 674,865 issued to Harrington on May 28, 1901 discloses a device which is adapted to be secured to a hitching-strap and which will automatically grip upon a post or other similar object and be locked in engagement therewith.

U.S. Pat. No. 2,643,151 issued to Zupancic on Jun. 23, 1953 discloses a device in the nature of a pliers particularly for use by fishermen for holding a fish while removing fish hooks from such fish.

U.S. Pat. No. 3,664,703 issued to Talley on May 23, 1972 discloses hand tongs especially for use by an angler for easy, safe and quick handling of the fish following their hooking and reeling-in by the angler.

U.S. Pat. No. 4,563,833 issued to Aucoin on Jan. 14, 1986 discloses fish holding pliers having longitudinally curved jaws with well rounded transversely extending grooves providing broad teeth having rounded surfaces to engage and hold a fish without seriously injuring the fish or piercing the scales or skin of the fish.

U.S. Pat. No. 4,620,386 issued to Hare on Nov. 4, 1986 discloses a method of orienting a fish using a pair of tine members and a pair of jaw members. The pair of tine members are simultaneously inserted into the respective gills of a fish, entering the gills from outside the fish. The jaw members are clamped around the torso of the fish directly below the fish's gills and at an acute angle with respect to the path of insertion of the tine members.

U.S. Pat. No. 4,899,482 issued to Gerdes on Feb. 13, 1990 discloses a modified hemostat adapted to be used as a multipurpose fishing tool has a clamping section, a fulcrum and handles. The clamping section has a first short space proximate to the tips and a longer space proximate to flat-shaped sections adjacent the fulcrum. The spaces are on the inner surface of the clamping section and are formed by cavities in the jaws. The jaws should be designed to be in substantial contact when the hemostat is in the closed position. The unit can also have crimpers, cutters and vices on its inner surfaces. The device is intended primarily for removing a hook from a mouth of a fish.

U.S. Pat. No. 5,119,585 issued to Camp on Jun. 9, 1992 discloses a tool for more effectively gripping and handling fish which includes a generally cylindrical tubular housing defining a handle having a hand grip thereon with a pair of pivotal gripping jaws actuated by a slidable sleeve that is spring biased away from the handgrip by two light coil springs to enable the sleeve to be retracted by the use of one finger or thumb of the hand which is used to grip the handgrip in order to open the jaws. The jaws, when open, are placed over the bottom lip of the fish and the sleeve is released with the light spring causing the jaws to grip the lip of the fish in order to lift the fish.

U.S. Pat. No. 6,272,709 issued to Strini on Aug. 14, 2001 discloses a multipurpose fishing tool for tying knots comprises an improvement in a known fishing forceps by adding an annular groove around the nose of the forceps. The groove is of sufficient depth to retain a loop of fishing line, which is twisted as the forceps jaws are moved in a rotary or nutating motion.

U.S. Pat. No. 6,560,913 issued to Liao on May 13, 2003 discloses a weighing device having a tubular housing, a pair of levers pivotally securing the tubular housing and each having a jaw biased to grasp an object to be weighed and a handle for moving the jaws away from each other against a spring.

U.S. Pat. No. 6,571,505 issued to Poiencot on Jun. 3, 2003 discloses an apparatus for holding a fish including fish grasping tongs having jaws at the distal end thereof for placement on the inside and outside of the mouth of a fish, and a hollow case for slidably receiving the fish grasping tongs, the case being adapted to force the tongs to close together as the distal end of the tongs is drawn toward the case.

U.S. Pat. No. 6,602,124 issued to Miller on Aug. 5, 2003 discloses a fish holder featuring a shortened handle section and teeth lining the entire length of the jaws of the holder is disclosed. The teeth in the jaws provide multiple points of contact against a fish, thereby enhancing control and grip on the fish. The disclosed invention may be constructed of two convex jaws or a combination of one convex jaw and one concave jaw. Teeth may also be arranged in a plurality of rows extending the length of the jaws. Use of the invention prevents contact with sharp body parts of the fish, such as teeth or spines.

The patents described above disclose a variety of structures used to grasp fish by the lip, the body or the gills. They also disclose a variety of handles. However, none of the disclosed handles are ergonomically suitable for moving a fish into various positions. Those skilled in the art will appreciate that it is often necessary to rotate or otherwise move the fish into various positions.

It is therefore desirable to provide a fish gripping device having an ergonomic handle designed to easily manipulate the positioning of the fish.

It is also desirable to provide an ergonomic fish gripping tool wherein the handle and fish being held are readily manipulated by the operator's thumb only.

SUMMARY OF THE INVENTION

The present invention provides a device for grasping a fish such that it may be removed from the water and a hook may be removed from its mouth. The working end of the tool comprises a pair of pincers that come together such that a fish's lip may be firmly held between them. Each of the pincers is attached to a handle. One of the handles has a series of four holes that form a slight arc. This handle is held by inserting one or more fingers into the holes. The other handle has a flattened end and a single ring attached to it by a pivot pin. The operator thumb is placed in the ring and is easily rotated about the pivot pin. The handles preferably have the locking mechanism to hold the pincers firmly together. When a fish is held by the lips between the pincers and the tool is locked together, the fish and the tool may be rotated or otherwise re-positioned utilizing only one or more fingers or just the thumb. Pivoting action of the thumb ring allows the operator to rapidly and easily rotate the tool and fish using only his or her thumb. Those skilled in the art will appreciate that the present invention greatly lessens the effort required to maneuver a fish into a desired position.

Because the other handle includes finger holes, the tool and a fish may alternatively be maneuvered using just the operator's fingers. The design of the handle makes it virtually impossible for the tool to accidently fall out of the operator's hand. Those skilled in the art will appreciate that when fishing one's hands are often slippery because they are wet or because they have fish slime on them. The design of this handle is far superior to other handles that have contours to match the operator's fingers and/or rubber or plastic coatings intended to increase friction.

Preferably, at least one of the handles has a lanyard at the end of it that is large enough that it may be hung on a hook or attached to a belt. Although this feature does not necessarily improve or enhance the utilitarian aspects of the device, it does provide for convenient storage of the tool.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

The present invention relates to an improved, ergonomic tool for gripping a fish so that it may be removed from the water and may be held while a hook is removed from it. The tool has two specially designed handles that allow the tool to be operated by only one or more fingers or by only the thumb or by the entire hand. The handle designed to engage a thumb includes a pivoting thumb ring that allows the tool to be easily manipulated using only a thumb. The pivoting of the thumb ring allows the thumb to be positioned in an ergonomically suitable position and also allows the ring itself to turn such that it is flush with the rest of the tool. By making the ring flush with the remainder of the tool, the tool is more easily stored because it is very flat. The tool is preferably made of stainless steel but may also be constructed of hard plastics or other suitably strong material.

Figure 1:
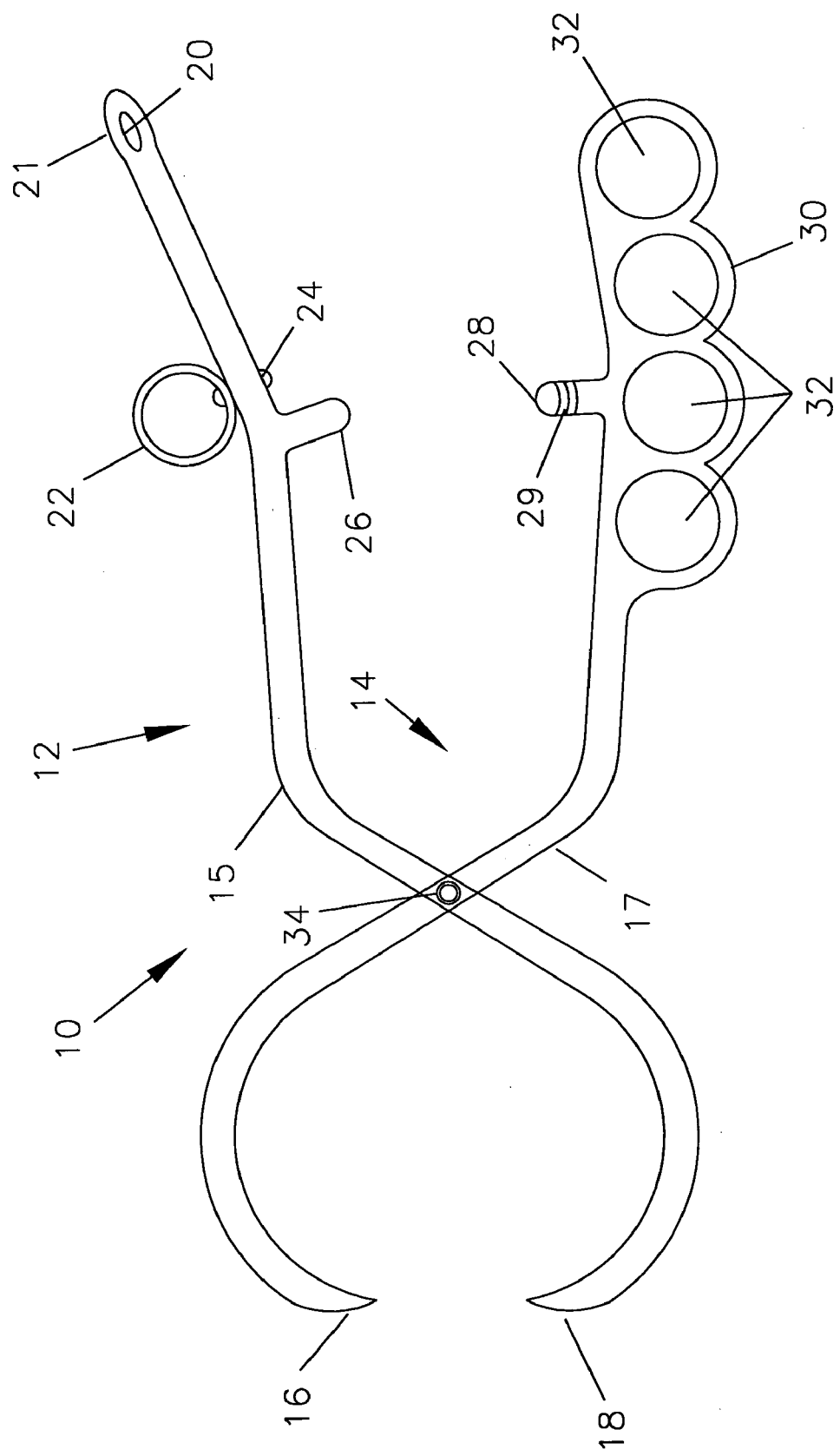
FIG. 1 is a side view of the invention.

FIG. 1 illustrates fish gripping tool 10. Tool 10 is comprised of thumb member 12 and finger member 14. Pivotal members 12 and 14 are pivotally attached to one another by pivot pin 34. At the end of thumb member 12 is pincer 18. Similarly, at the end of finger member 14 is pincer 16. Pivotal members 12 and 14 may pivot about pivot pin 34 such that pincer 18 and pincer 16 come into contact. By bringing pincer 16 and 18 together around the lip of a fish, the fish may be firmly held without the operator coming into physical contact with the fish.

Thumb member 12 is comprised of an arm 15 that connects pincer 18 to member end 21. In this particular embodiment, member end 21 includes lanyard 20 that allows tool 10 to be hung on a hook or attached to an object using twine or rope. Thumb member 12 also includes thumb ring 22. Thumb ring 22 is of a diameter suitable for a person's thumb to easily slide inside it. Preferably, thumb ring 22 has a diameter slightly larger than that of an average thumb. Although it is desirable to have a thumb ring 22 large enough to accommodate almost any thumb, it should not be so large that a thumb may easily slip out of it. Thumb ring 22 is rotatably attached to arm 15 by pivot pin 24. Pivot pin 24 allows thumb ring 22 to easily pivot about it. In this particular embodiment arm 15 is slightly sigmoidal in shape. Those skilled in the art will appreciate that arm 16 may be comprised of a variety of shapes so long as locking tab 26 may engage with locking tab 28 as described below.

Finger member 14 is comprised of arm 17 ending with pincer 16 at one end and finger handle 30 at the opposite end. Finger handle 30 is comprised of at least one finger loop 32. In the preferred embodiment shown in FIG. 1, handle 30 is comprised of four finger loops, one for each finger. Finger member 14 also includes locking tab 28. Locking tabs 26 and 28 comprise a known means for locking handles into a fixed position. Locking tabs 26 and 28 have opposed interlocking surfaces as indicated at 29. Locking tabs 26 and 28 permit locking arms 15 and 17 together such that pincer 16 and 18 are pressed together. Those skilled in the art will appreciate that when a fish's lip is engaged by pincer 16 and 18 and locking pads 26 and 28 are engaged to one another, the tool will remain firmly attached to a fish's lip even when no pressure is applied to thumb member 12 and finger member 14. When the tool is locked, the operator may use only his or her thumb or only fingers to manipulate the tool and the fish. The swiveling action of the thumb ring allows the tool and fish to be easily maneuvered utilizing only the operator's thumb.

Figure 2:
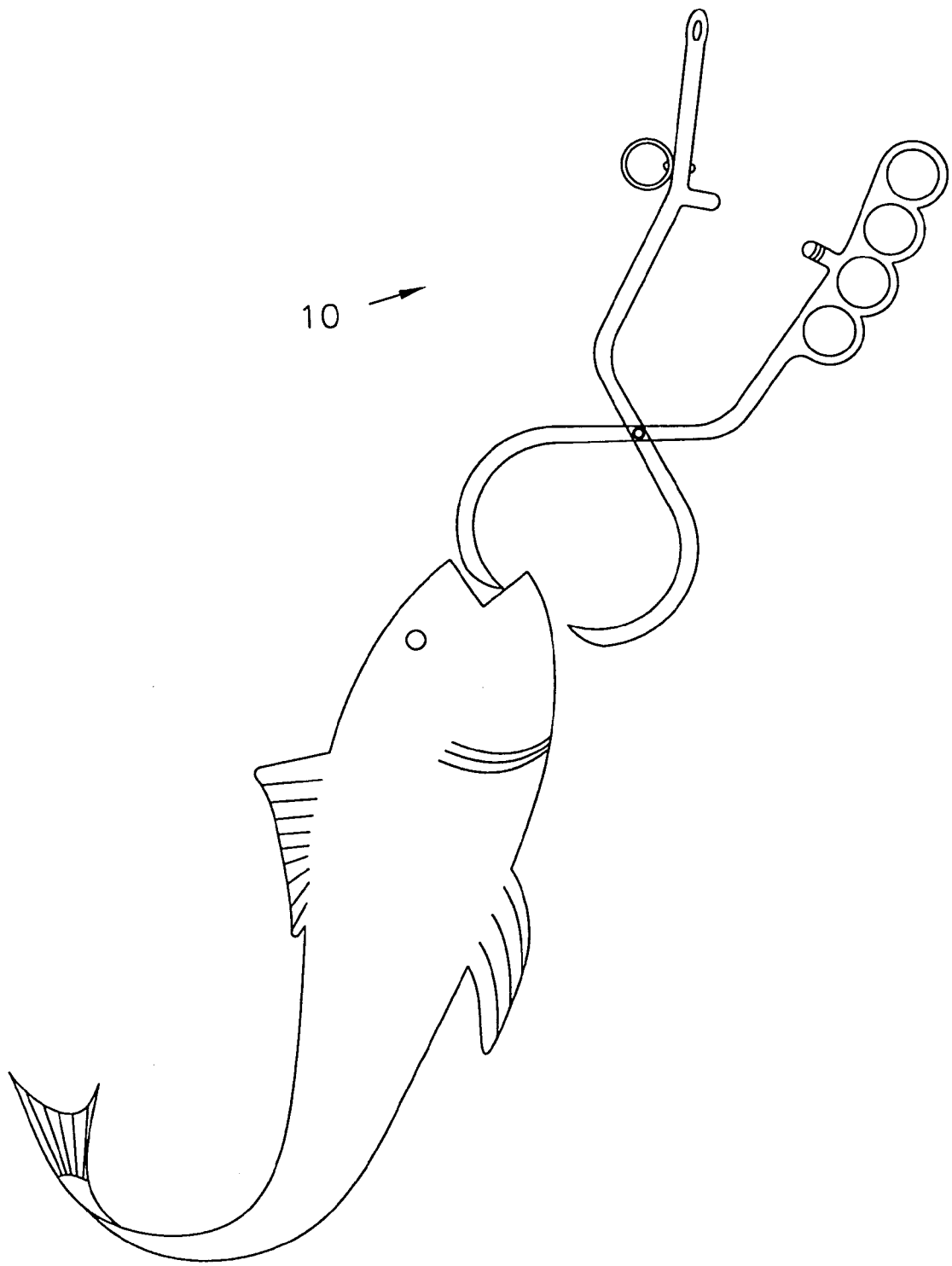
FIG. 2 is an environmental view of the invention.

FIG. 2 shows tool 10 engaged with a fish. Those skilled in the art will appreciate that a fish engaged by tool 10 in this manner may be held firmly so that it does not drop and get away.

Whereas, the present invention has been described in relation to the drawings attached hereto, it should be understood that other and further modifications, apart from those shown or suggested herein, may be made within the spirit and scope of this invention.

What is claimed is:
1. A tool for gripping a fish comprising:
   a thumb member comprising an arm, a pincer, and a distal end;
   a thumb ring pivotally attached to the arm of the thumb member by a first pivot pin having an axis of rotation;
   a finger member comprising a pincer, an arm and a handle, wherein the handle is comprised of at least one finger loop;
   a means for locking the thumb member and the finger member together;
   wherein the thumb member and the finger member are pivotally connected between the arms and pincers by a second pivot pin, the second pivot pin having an axis of rotation that is perpendicular to the axis of rotation of the first pivot pin.
2. The tool of claim 1 wherein the at least one finger loop comprises four finger loops.
3. The tool of claim 1 wherein the distal end of the thumb member comprises a lanyard loop.
4. The tool of claim 1 wherein the tool is comprised of stainless steel.

* * * * *